(12) United States Patent
Stenevik (10) Patent No.: US 9,376,893 B2
(45) Date of Patent: *Jun. 28, 2016

(54) SUBSEA HYDROCARBON PRODUCTION SYSTEM

(71) Applicant: Statoil Petroleum AS, Stavanger (NO)

(72) Inventor: Karl-Atle Stenevik, Sandsli (NO)

(73) Assignee: Statoil Petroleum AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,513

(22) Filed: Aug. 21, 2015

(65) Prior Publication Data

US 2015/0361771 A1 Dec. 17, 2015

Related U.S. Application Data (62) Division of application No. 14/273,052, filed on May 8, 2014, now Pat. No. 9,121,231, which is a division of application No. 12/789,570, filed on May 28, 2010, now Pat. No. 8,757,270.

(51) Int. Cl.
*E21B 17/02* (2006.01)
*E21B 43/01* (2006.01)
(Continued)

(52) U.S. Cl.
CPC ............ *E21B 43/017* (2013.01); *E21B 17/003* (2013.01); *E21B 17/01* (2013.01);
(Continued)

(58) Field of Classification Search
CPC .... E21B 43/017; E21B 47/0001; E21B 47/12
USPC ........ 166/345, 338, 344, 366–369; 340/853.1
See application file for complete search history.

(56) References Cited

U.S. PATENT DOCUMENTS

| 3,275,097 A | 9/1966 | Pavey, Jr. | |
| 3,590,919 A * | 7/1971 | Talley, Jr. | ............... B01D 19/00 166/357 |

(Continued)

FOREIGN PATENT DOCUMENTS

| DE | 4004228 | 8/1991 |
| EP | 0018053 | 10/1980 |

(Continued)

OTHER PUBLICATIONS

A. V. Gorbatikov et al., "Simulation of the Rayleigh Waves in the Proximity of the Scattering Velocity Heterogeneities. Exploring the Capabilities of the Microseismic Sounding Method," Izvestiya, Physics of the Solid Earth, 2011, pp. 354-369, vol. 47, No. 4, Pleiades Publishing, Ltd.

(Continued)

*Primary Examiner* — Matthew R Buck
(74) *Attorney, Agent, or Firm* — Patterson Thuente Pedersen, P.A.

(57) ABSTRACT

A subsea oil and/or gas production system comprises a host production facility and a plurality of subsea wells. A fluid conveying network is provided that connects each subsea well to the host production facility. A separate electrical power and data network is provided for conveying direct current electrical power and data, operatively connected to each subsea well for providing each subsea well with data transfer and electrical power services. The use of direct current ensures that the electrical power and data network can provide power over much greater distances than currently available, and the use of separate networks for conveying fluids and for providing electrical power and data transfer allows for a much more flexible system.

6 Claims, 4 Drawing Sheets

(51) Int. Cl.
*E21B 43/017* (2006.01)
*E21B 47/12* (2012.01)
*E21B 17/00* (2006.01)
*E21B 17/01* (2006.01)
*E21B 19/00* (2006.01)

(52) U.S. Cl.
CPC .............. *E21B 17/02* (2013.01); *E21B 19/002* (2013.01); *E21B 43/01* (2013.01); *E21B 43/0107* (2013.01); *E21B 47/12* (2013.01)

(56) References Cited

U.S. PATENT DOCUMENTS

| | | | |
|---|---|---|---|
| 4,378,848 A * | 4/1983 | Milberger | E21B 33/0355 166/351 |
| 4,547,869 A | 10/1985 | Savit | |
| 4,576,479 A | 3/1986 | Downs | |
| 4,583,095 A | 4/1986 | Peterson | |
| 4,603,407 A | 7/1986 | Cowles | |
| 4,843,597 A | 6/1989 | Gjessing et al. | |
| 4,862,422 A | 8/1989 | Brac | |
| 4,909,671 A | 3/1990 | Skjong | |
| 4,942,557 A | 7/1990 | Seriff | |
| 4,970,699 A | 11/1990 | Bucker et al. | |
| 4,992,995 A | 2/1991 | Favret | |
| 5,029,023 A | 7/1991 | Bearden et al. | |
| 5,070,483 A | 12/1991 | Berni | |
| 5,109,362 A | 4/1992 | Berni | |
| 5,144,588 A | 9/1992 | Johnston et al. | |
| 5,159,406 A | 10/1992 | Adler et al. | |
| 5,317,383 A | 5/1994 | Berni | |
| 5,444,619 A | 8/1995 | Hoskins | |
| 5,477,324 A | 12/1995 | Berthelot et al. | |
| 5,570,321 A | 10/1996 | Bernitsas | |
| 5,671,136 A | 9/1997 | Willhoit, Jr. | |
| 5,724,309 A | 3/1998 | Higgs | |
| 5,892,732 A | 4/1999 | Gersztenkorn et al. | |
| 5,940,777 A | 8/1999 | Keskes | |
| 5,987,388 A | 11/1999 | Crawford et al. | |
| 6,011,557 A | 1/2000 | Keskes et al. | |
| 6,011,753 A | 1/2000 | Chien | |
| 6,026,057 A | 2/2000 | Byun et al. | |
| 6,028,817 A | 2/2000 | Ambs | |
| 6,049,760 A | 4/2000 | Scott | |
| 6,081,481 A | 6/2000 | Sabatier et al. | |
| 6,134,966 A | 10/2000 | Donskoy et al. | |
| 6,141,440 A | 10/2000 | Melen | |
| 6,182,015 B1 | 1/2001 | Altan et al. | |
| 6,301,193 B1 | 10/2001 | Martin et al. | |
| 6,420,976 B1 | 7/2002 | Baggs et al. | |
| 6,456,565 B1 | 9/2002 | Grall et al. | |
| 6,473,695 B1 | 10/2002 | Chutov et al. | |
| 6,536,528 B1 * | 3/2003 | Amin | B63B 22/021 166/352 |
| 6,672,391 B2 * | 1/2004 | Anderson | E21B 43/017 166/267 |
| 6,725,163 B1 | 4/2004 | Trappe et al. | |
| 6,735,526 B1 | 5/2004 | Meldahl et al. | |
| 6,739,165 B1 | 5/2004 | Strack | |
| 6,752,214 B2 * | 6/2004 | Amin | B63B 22/021 166/354 |
| 6,772,840 B2 * | 8/2004 | Headworth | E21B 17/18 166/302 |
| 6,787,758 B2 | 9/2004 | Tubel et al. | |
| 6,788,618 B2 | 9/2004 | Clayton et al. | |
| 6,873,571 B2 | 3/2005 | Clayton et al. | |
| 7,011,152 B2 * | 3/2006 | Soelvik | E21B 7/128 166/352 |
| 7,032,658 B2 * | 4/2006 | Chitwood | E21B 4/04 166/272.1 |
| 7,065,449 B2 | 6/2006 | Brewster et al. | |
| 7,065,568 B2 | 6/2006 | Bracewell et al. | |
| 7,137,451 B2 * | 11/2006 | Smith | E21B 33/0355 166/335 |
| 7,261,162 B2 * | 8/2007 | Deans | E21B 41/0007 166/250.01 |
| 7,311,151 B2 * | 12/2007 | Chitwood | E21B 4/04 166/272.1 |
| 7,383,133 B1 | 6/2008 | Scott | |
| 7,386,397 B2 | 6/2008 | Amundsen et al. | |
| 7,463,549 B2 | 12/2008 | Naess | |
| 7,530,398 B2 * | 5/2009 | Balkanyi | B08B 9/055 165/154 |
| 7,615,893 B2 * | 11/2009 | Biester | E21B 33/0355 307/82 |
| 7,660,188 B2 | 2/2010 | Meldahl | |
| 7,703,535 B2 * | 4/2010 | Benson | E21B 17/01 141/82 |
| 7,715,988 B2 | 5/2010 | Robertsson et al. | |
| 7,720,609 B2 | 5/2010 | Meldahl | |
| 7,721,807 B2 * | 5/2010 | Stoisits | E21B 43/017 166/268 |
| 7,793,724 B2 * | 9/2010 | Daniel | E21B 43/017 166/350 |
| 7,817,495 B2 | 10/2010 | Ozbek et al. | |
| 7,918,283 B2 * | 4/2011 | Balkanyi | B08B 9/055 137/15.07 |
| 7,931,090 B2 * | 4/2011 | Smedstad | E21B 43/128 166/250.15 |
| 7,933,003 B2 | 4/2011 | Meldahl et al. | |
| 7,958,938 B2 * | 6/2011 | Crossley | E21B 43/017 166/339 |
| 7,992,632 B2 * | 8/2011 | Bornes | E21B 43/01 166/272.1 |
| 8,033,336 B2 * | 10/2011 | Benson | E21B 17/01 141/82 |
| 8,089,390 B2 | 1/2012 | Jones et al. | |
| 8,115,491 B2 | 2/2012 | Alumbaugh et al. | |
| 8,212,410 B2 * | 7/2012 | Biester | E21B 33/0355 307/82 |
| 8,351,298 B2 | 1/2013 | De Kok et al. | |
| 8,498,176 B2 | 7/2013 | Meldahl et al. | |
| 8,757,270 B2 * | 6/2014 | Stenevik | E21B 43/017 166/345 |
| 9,081,111 B2 | 7/2015 | Amundsen et al. | |
| 9,116,254 B2 | 8/2015 | Bussat et al. | |
| 9,121,231 B2 * | 9/2015 | Stenevik | E21B 43/017 |
| 9,164,188 B2 | 10/2015 | Bruun et al. | |
| 2002/0126575 A1 | 9/2002 | Bittelston et al. | |
| 2003/0060102 A1 | 3/2003 | Ambs | |
| 2003/0102720 A1 * | 6/2003 | Baggs | E21B 33/0355 307/149 |
| 2004/0015296 A1 | 1/2004 | Causse et al. | |
| 2004/0022125 A1 | 2/2004 | Clayton et al. | |
| 2004/0122593 A1 | 6/2004 | Haldorsen | |
| 2004/0144543 A1 * | 7/2004 | Appleford | E21B 34/04 166/336 |
| 2004/0228214 A1 | 11/2004 | Tulett | |
| 2004/0262008 A1 | 12/2004 | Deans et al. | |
| 2005/0068850 A1 | 3/2005 | Muyzert et al. | |
| 2005/0152220 A1 | 7/2005 | Kritski et al. | |
| 2005/0178556 A1 * | 8/2005 | Appleford | E21B 43/017 166/366 |
| 2005/0209783 A1 | 9/2005 | Bittleston | |
| 2005/0288862 A1 | 12/2005 | Rode et al. | |
| 2006/0098529 A1 | 5/2006 | Anderson et al. | |
| 2006/0153005 A1 | 7/2006 | Herwanger et al. | |
| 2006/0175062 A1 | 8/2006 | Benson | |
| 2006/0285435 A1 | 12/2006 | Robertsson et al. | |
| 2006/0285437 A1 | 12/2006 | Sinha et al. | |
| 2007/0075708 A1 | 4/2007 | Reddig et al. | |
| 2007/0299614 A1 | 12/2007 | Dewarrat | |
| 2008/0019215 A1 | 1/2008 | Robertsson et al. | |
| 2008/0288173 A1 | 11/2008 | Saenger | |
| 2009/0128800 A1 | 5/2009 | Meldahl et al. | |
| 2009/0154291 A1 | 6/2009 | Ferber | |
| 2009/0204330 A1 | 8/2009 | Thomsen et al. | |
| 2010/0128561 A1 | 5/2010 | Meldahl et al. | |
| 2010/0133901 A1 * | 6/2010 | Zhang | H02M 5/458 307/11 |
| 2010/0171501 A1 | 7/2010 | Alumbaugh et al. | |
| 2010/0211323 A1 | 8/2010 | Ozdemir et al. | |

(56) References Cited

U.S. PATENT DOCUMENTS

| | | | | |
|---|---|---|---|---|
| 2010/0252260 | A1* | 10/2010 | Fowler | F17D 1/17 166/275 |
| 2010/0332139 | A1 | 12/2010 | Bruun et al. | |
| 2011/0046885 | A1 | 2/2011 | Bussat et al. | |
| 2011/0085420 | A1 | 4/2011 | Bussat et al. | |
| 2011/0242935 | A1 | 10/2011 | Amundsen et al. | |
| 2011/0247825 | A1* | 10/2011 | Batho | E21B 41/0007 166/335 |
| 2011/0251728 | A1* | 10/2011 | Batho | F04B 47/06 700/282 |
| 2011/0290497 | A1 | 12/2011 | Stenevik | |

FOREIGN PATENT DOCUMENTS

| | | |
|---|---|---|
| EP | 1403662 | 3/2004 |
| EP | 1879052 | 1/2008 |
| FR | 2765344 | 12/1998 |
| GB | 2001021 | 1/1979 |
| GB | 2299108 | 9/1996 |
| GB | 2331971 | 6/1999 |
| GB | 2331971 | 11/1999 |
| GB | 2342081 | 4/2000 |
| GB | 2347744 | 9/2000 |
| GB | 2364388 | 1/2002 |
| GB | 2410635 | 8/2005 |
| GB | 2416835 | 2/2006 |
| GB | 2454745 | 5/2009 |
| GB | 2460170 | 11/2009 |
| JP | 2005275540 | 10/2005 |
| RU | 2072534 | 1/1997 |
| RU | 2121133 | 10/1998 |
| RU | 9533 | 3/1999 |
| RU | 2246122 | 2/2005 |
| RU | 2271554 | 3/2006 |
| SU | 1728825 | 4/1992 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO02/072999 | 9/2002 |
| WO | WO 02/073241 | 9/2002 |
| WO | WO02072999 | 9/2002 |
| WO | WO 2004/003589 | 1/2004 |
| WO | WO2004003339 | 1/2004 |
| WO | WO 2004/044617 | 5/2004 |
| WO | WO 2005/078479 | 8/2005 |
| WO | WO 2006/011826 | 2/2006 |
| WO | WO 2007/141725 | 12/2007 |
| WO | WO2009047319 | 2/2009 |
| WO | WO2009042319 | 4/2009 |
| WO | WO2009151910 | 12/2009 |

OTHER PUBLICATIONS

A. V. Gorbatikov et al, "Microseismic Field Affected by Local Geological Heterogeneities and Microseismic Sounding of the Medium," Izvestiya, Physics of the Solid Earth 2008, pp, 577-592, vol. 44, No. 7, Pleiades Publishing Ltd.
Written Opinion and International Search Report from International Application No. PCT/EP2010/057403 dated Jul. 13, 2011.
Invitation to pay Additional Fees and Partial ISR from International Application No. PCT/EP2011/055140 dated May 30, 2012.
GB Search Report from GB Application No. 1005574.7 dated Jul. 21, 2010.
International Search Report and Written Opinion dated Jul. 13, 2011 for International Application No. PCT/EP2010/057403 filed May 28, 2010.
Russian Office Action for Russian Application No. 2009122380/28030897 dated Jul. 11, 2011.
Artman, Brad, "Imaging passive seismic data," *Geophysics*, vol. 71, No. 4, pp. S1177-S1187, SP-002479903 (Jul.-Aug. 2006).
Berni, "Remote sensing of seismic vibrations by laser Doppler interferometry" Geophysics. vol. 59, No. pp. 1856-1867. Dec. 1994.
Castagna, John P., et al., "Instantaneous spectral analysis: Detection of frequency shadows associated with hydrocarbons," *The Leading Edge*, XP-002461160, pp. 120-127 (Feb. 2003).
Daneshvar, M. Reza, et al., "Passive seismic imaging using micro-earthquakes," *Geophysics*, vol. 60, No. 4, pp. 1178-1186 (Jul.-Aug. 1995).
Hohl, Detlef, et al., "Passive Seismic Reflectivity Imaging with Ocean-Botton Cable Data," *SEG/New Orleans 2006 Annual Meeting*, XP-002-156524343, pp. 1560 (2006).
Meldahl et al., Identifying Faults and Gas Chimneys Using Multiattributes and Neural Networks, May 2001. The Leading Edge. pp. 474-482.
Wood et al., "Decreased Stability of Methane Hydrates in Marine Sediments Owing to Phase-Boundary Roughness" Dec. 12, 2002. Nature, vol. 420. pp. 656-660.
International Search Report—PCT/IB2005/000075 dated Mar. 2, 2006 and GB 0500484.1 dated Apr. 12, 2006.
International Search Report—PCT/GB2007/004348 dated Feb. 27, 2009 and Search Report GB 0622697.1 dated Feb. 16, 2007.
international Search Report—PCT/GB2008/051223 dated Apr. 29, 2010.
International Search Report—PCT/GB2006/003000 dated Dec. 29, 2006 and Search Report for GB 0516720.0 dated Nov. 8, 2006.
International Search Report—PCT/GB99/03039 dated Jan. 12, 2000.
Preliminary Examination Report—PCT/GB99/03039 dated Oct. 10, 2000.
Application and File History for U.S. Pat. No. 8,757,270 issued Jun. 24, 2014, inventor Stenevik.
Goldstein, Classical Mechanics. 2nd Edition. 1981. p. 164.
Seismic Waves and Earth Oscillations. Downloaded Jun. 29. 2013.
Bensen et al., Processing Seismic Ambient Noise Data to Obtain reliable Broad-band surface wave dispersion measurements, Jul. 28, 2006-2007. 1239-1260.
International Search Report—PCT/GB2008/004243 dated May 7, 2009.
Application and File History for U.S. Pat. No. 9,121,231 issued Sep. 1, 2015, inventor Stenevik.
Knopoff et al., "Seismic Reciprocity" Geophysics. vol. 24, No. 4, Oct. 1959. pp. 681-691.
Application and File History for U.S. Pat. No. 9,081,111 issued Julv 14, 2015, inventors Amundsen et al.
Application and File History for U.S. Pat. No. 9,164,188 issued Oct. 20, 2015, inventors Bruun et al.
Application and File History for U.S. Pat. No. 9,116,254 issued Aug. 25, 2015, inventors Bussat et al.
African Regional Intellectual Property Organization (ARIPO) dated May 28, 2010.Notification of Non-Compliance with Substantive Requirements and Invitation to Submit Observations and/or Amended Application.
SIPO of the People's Republic Notification of the First Office Action for Application No. 201080068251.3 dated Sep. 17, 2014.
Russian Official Action of substantive examination for Russian Application No. 2012155005/03(087252) filed May 28, 2010. Translation. 5 pages.
Australian Patent Examination Report No. 1 for Australian Application No. 2010353877 dated Mar. 13, 2014.

\* cited by examiner

SUBSEA HYDROCARBON PRODUCTION SYSTEM

RELATED APPLICATION

This application is a division of application Ser. No. 14/273,052 filed May 8, 2014, which in turn is a division of application Ser. No. 12/789,570 filed May 28, 2010, now U.S. Pat. No. 8,757,270 issued Jun. 24, 2014, each of which is hereby fully incorporated herein by reference.

TECHNICAL FIELD

The present invention relates to subsea hydrocarbon production, and in particular to systems for connecting a host production facility to subsea wells.

BACKGROUND OF THE INVENTION

In subsea hydrocarbon production systems, a host production facility such as shore based production facility or an offshore platform is typically connected to one or more subsea wells. Production pipelines connect each subsea well to the host production facility. Production pipelines are used for conveying extracted hydrocarbons back to the host production facility. In addition to the production pipelines, it is necessary to provide each subsea well with certain services. These may include electric power, data transfer, hydraulic fluids and wellstream service fluids, such as chemical additives. These four services are normally provided in a subsea umbilical.

Figure 1:
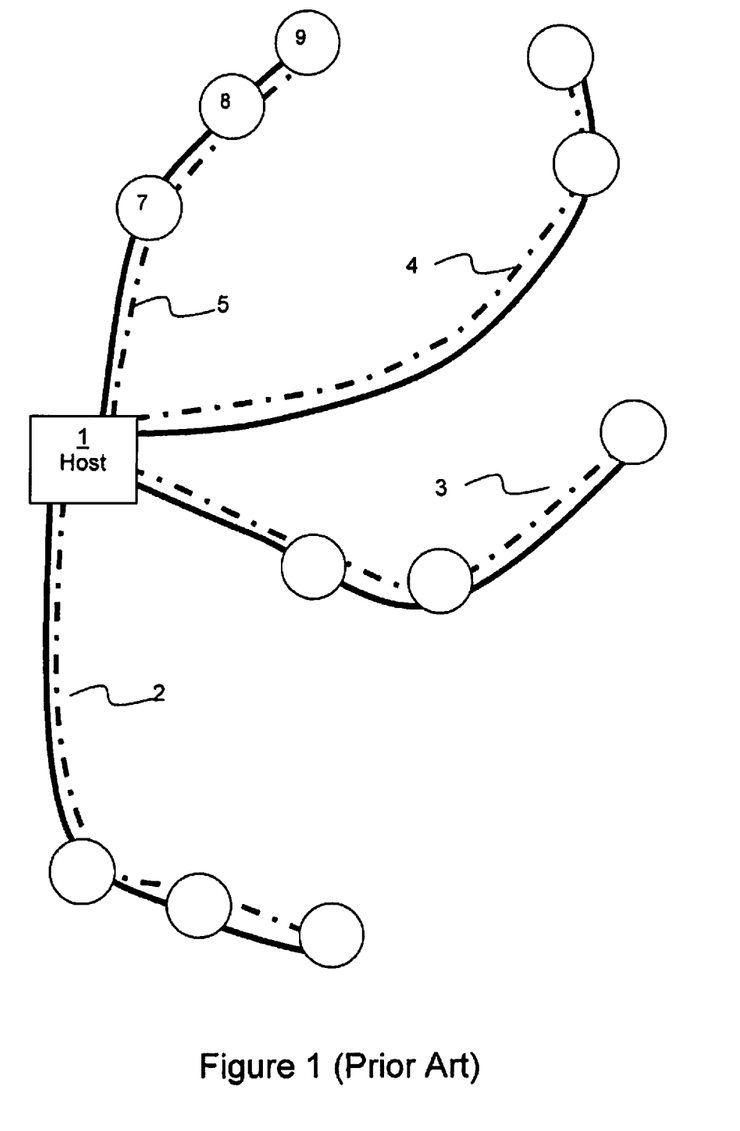
FIG. 1 illustrates schematically a plurality of subsea wells connected to a host production facility.

Referring to FIG. 1 herein, there is illustrated schematically a network of subsea wells connected to a host production facility 1. Several subsea umbilicals 2, 3, 4, 5 are connected to the host production facility 1. Each umbilical connects several subsea wells (shown in FIG. 1 as circles) to the host production facility 1. Taking umbilical 5 as an example, this connects subsea wells 7, 8 and 9 to the host production facility 1. Note that each subsea well, for example subsea well 7, could comprise several physical wells. In addition to the umbilicals, hydrocarbon-carrying pipelines are also shown as thick black lines that follow substantially the same route as the umbilicals 2, 3, 4, 5.

Figure 2:
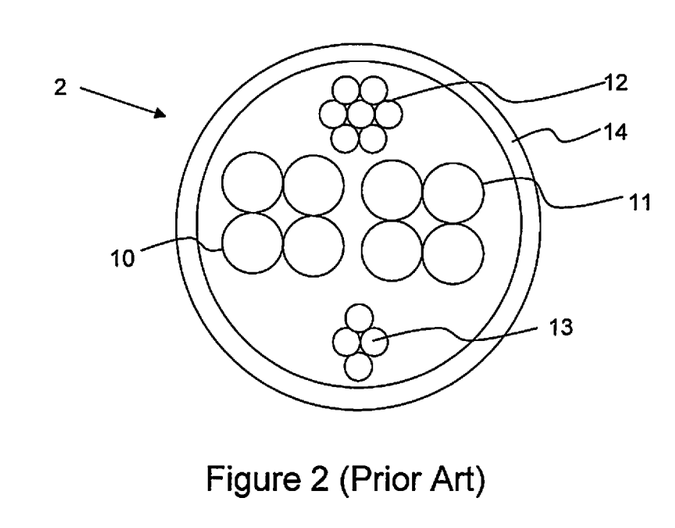
FIG. 2 illustrates schematically a cross-section view of a subsea umbilical.

FIG. 2 is for the purposes of illustration only to show the services provided in an umbilical. An umbilical 2 typically includes several hydraulic fluid conduits 10 (four are shown in FIG. 2), for providing hydraulic power for opening and closing valves. Furthermore, an umbilical typically includes several wellstream service fluid conduits 11 (four are shown in FIG. 2) for carrying wellstream service fluids of different compositions, depending on the wellstream composition and the purpose of the wellstream fluid. Seven electrical cables 12 are shown in FIG. 2, which provide electric power to subsea control modules. The subsea control modules in turn provide hydraulic power to subsea wells. Furthermore, four data transfer cable 13 bundles are shown in FIG. 2. Of course, these numbers are illustrative only, and different umbilicals may have different numbers of hydraulic fluid conduits 10, wellstream service fluid conduits 11, electrical cables 12 and data transfer cables 13. This depends on various factors, such as the number of subsea wells served by the umbilical, the distance that the umbilical must traverse and so on. A protective sheath 14 is also provided.

Subsea umbilical 2 connects the subsea wells 7, 8 and 9 to the host production facility 1 in series, typically by 'daisy-chaining' In other words, in order to provide electric power and data transfer between the host production facility and subsea wells, these services must pass subsea wells 7 and 8. A typical subsea umbilical may serve 12 or more subsea wells, but there are practical limits on the number of subsea wells that can be served by a subsea umbilical.

As control systems for subsea wells become more sophisticated, the electric power and data transfer requirements for each subsea well increase. In time, this will either reduce the number of subsea wells that can be connected to each subsea umbilical, or require subsea umbilicals with a larger capacity to transfer electric power and data. This could greatly increase the costs of subsea umbilicals.

Another problem with existing subsea umbilicals is that the cost of extending a subsea umbilical to a new subsea well in a new marginal prospect can be prohibitively expensive, especially if the subsea well must be connected to a host facility with a new umbilical.

A further problem associated with existing subsea umbilicals is that when a subsea umbilical develops a fault, it can affect all of the subsea wells 'downstream' of the fault, and so repairs and upgrades can be expensive in terms of lost production.

Existing subsea umbilicals use alternating current. Each power transmission cable in a subsea umbilical acts as a capacitor, and so where alternating current is used the capacitance properties appear in parallel with the electrical load. This leads to losses in power transmission, which limit the practical length of a subsea umbilical to around 150 km.

SUMMARY OF THE INVENTION

The inventor has realised that the existing system of providing services to subsea wells using subsea umbilicals has several problems as described above. It is an object of the present invention to mitigate some of these problems and provide an improved system of providing data transfer and electric power services to subsea wells.

According to a first aspect of the invention, there is provided a subsea oil and/or gas production system. The system provides a host production facility and a plurality of subsea wells. A fluid conveying network is provided that connects each subsea well to the host production facility. A separate electrical power and data network is provided for conveying direct current electrical power and data, operatively connected to each subsea well for providing each subsea well with data transfer and electrical power services. The use of direct current ensures that the electrical power and data network can provide power over much greater distances than currently available, and the use of separate networks for conveying fluids and for providing electrical power and data transfer allows for a much more flexible system.

The fluid conveying network is optionally arranged to convey any of hydraulic fluid, wellstream service fluid and recovered hydrocarbons. It is expected that a significant use of the invention will be to replace umbilicals in providing wellstream service fluids and hydraulic fluids, but the system may also be applied to production pipelines for conveying recovered hydrocarbons.

In addition to connecting to a fluid conveying network, wherein the electrical power and data network optionally further connects to any of a subsea observatory, an autonomous underwater vehicles, 4D seismic grids on the seafloor, subsea processing units, hydrocarbon pipelines and monitoring systems. This allows the same electrical power/data network to connect to other aspects of subea exploration and hydrocarbon extraction.

As an option, the subsea electrical power and data network comprises fibre optic communications for transmitting data. This allows for high bandwidth and no interference from electrical power sources.

A distance between a subsea well and the host production facility is optionally greater than 150 km. This is possible when using high voltage direct current.

The subsea hydrocarbon production system optionally further comprises a hub arranged to reduce a voltage in the direct current received from the host production facility before providing electrical power to each subsea well, the hub also arranged to transfer data. The hub may be connected to another hub to assist in redundancy and load balancing.

The subsea hydrocarbon production system is optionally provided with at least one branching unit between the host production facility and a hub, the hub arranged to reduce a voltage in the electrical power received from the branching unit before providing electrical power to a subsea well. The branching unit receives electrical power and data cables from the host production facility (or another branching unit) and provides separate electrical power and data cables to a plurality of hubs. This allows high voltage to be sent directly from the host production facility to several hubs via one or more branching units before the voltage is reduced by the hubs for use by the subsea wells.

The electrical power and data network is optionally arranged to transport high voltage direct current between the host production facility and a hub, wherein the hub is arranged to lower the voltage before supplying electrical power to a plurality of subsea wells.

The fluid conveying network may comprise a fluid conduit riser base between the host production facility and a subsea well. The fluid conduit riser base has a plurality of connections for connecting fluid conduit pipes between the fluid conduit riser base and at least one subsea well.

According to a second aspect of the invention, there is provided a subsea node (termed a "hub" above) for use in a subsea oil and/or gas production system. The subsea node comprises means for conveying data and electrical power to a plurality of subsea wells, the subsea wells being served by at least two separate fluid conveying networks linking the subsea wells to a host production facility.

The subsea node optionally further comprises means for conveying data and electrical power to any of subsea observatories, autonomous underwater vehicles, 4D seismic grids on the seafloor, subsea processing units, hydrocarbon pipelines and monitoring systems.

In a preferred embodiment, the means to convey data comprises a fibre optic communications system, which ensures that there is no interference from electric power sources.

The subsea node may further comprise means to operatively connect the subsea node via the means for conveying data and electrical power to a further subsea node. This allows subsea nodes to be interconnected to provide redundancy and allow for load balancing in the electrical power and data network.

The subsea node optionally comprises means to reduce the voltage of received electrical power before conveying the reduced voltage electrical power to a plurality of subsea wells. This allows it to receive high voltage direct current from the host production facility or a branching node that can be sent over long distance, and then reduce the voltage so that it is suitable for use by the subsea wells.

According to a third aspect of the invention, there is provided a subsea hydrocarbon production system comprising a host production facility, the host production facility being linked to a first fluid conveying network connecting at least one subsea well to the production host facility, and a second fluid conveying network connecting at least one further subsea well to the host production facility. A separate subsea electrical power and data network is also provided for conveying direct current electrical power and data, the electrical power and data network comprising a hub, wherein the network connects the hub to the host production facility and at least two separate fluid conveying networks.

DETAILED DESCRIPTION OF THE INVENTION

The inventor has realised that many of the problems associated with prior art subsea umbilicals can be mitigated by separating out the services. According to the present invention, subsea umbilicals are primarily used to convey hydraulic fluid and wellstream service fluids, and are not used to convey electric power to subsea wells or data between a subsea well and a host production facility. A separate electric power and data network is provided. The following description introduces the term "subsea fluid conduit" to refer to a subsea conduit that is used for conveying fluids such as hydraulic fluids and wellstream service fluids, but is not used to convey electric power or data.

Figure 3:
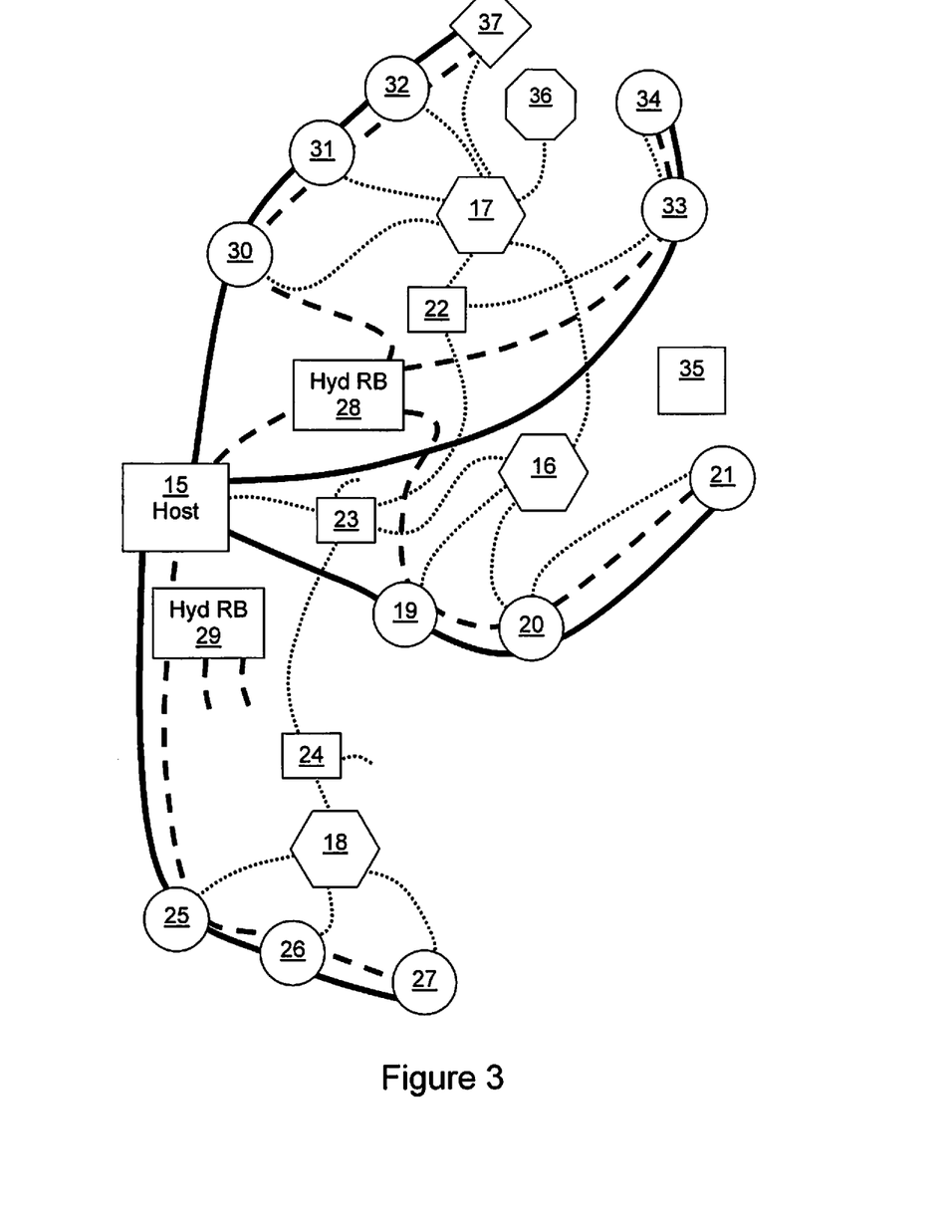
FIG. 3 illustrates schematically a plurality of subsea wells connected to a host production facility according to an embodiment of the invention.

Referring to FIG. 3 herein, a schematic diagram of a plurality of subsea wells connected to a host production facility 15 is illustrated. Pipelines carrying hydrocarbons are illustrated as thick black lines. Subsea fluid conduits are illustrated as thick dashed lines, and a separate network carrying data and electric power is illustrated as dotted lines. The separate network provides cables for electric power and data transfer, distributed in different ways. This type of network is referred to herein as a DC/FO network, as it provides DC current and data transfer using Fibre Optic (FO) cables.

The DC/FO network can typically provide a total system power of 100 kW and a total data bandwidth of 120 Gb/s, although it will be appreciated that any power and bitrates may be used within the constraints of the subsea environment. The DC/FO network in this description is served by hubs 16, 17 and 18, each with a typical output power of 10 kW and a data bandwidth of 1 Gb/s (limited by the subsea control system), although it will be appreciated that any power and bitrates may be used within the constraints of the subsea environment. The DC/FO network carries high voltage direct current from the host production platform 15 (or another source), and a function of the hub is to convert this voltage to a lower voltage usable by the subsea wells 19, 20, 21 (typically it must be converted from around 10,000V DC to below 1,000V DC). In the example of FIG. 3, hub 16 provides electric power and data to subsea wells 19, 20 and 21, and may also be connected to hub 17. The DC/FO network is separate from the subsea fluid conduit network and does not necessarily follow the same path as the subsea fluid conduit network.

In addition to hubs, the DC/FO network in this example is also provided with branching units 22, 24. A branching unit is effectively a cable splitter where a high voltage cable is input and two or more high voltage cables are output. The advantage of using branching units is that in the event of a fault or failure, individual portions of the DC/FO network can be isolated without affecting the rest of the DC/FO network. A subsea well can receive electric power from a hub, but not directly from a branching unit as the voltage supplied by a branching unit is too high. In this case, there will be a subsea node (hub) integrated in or in the near vicinity of the subsea well. This hub is not shown in FIG. 3 to maintain readability.

In order to extend a network, one or more cable pigtails (shown as unconnected dotted lines at branching units 22 and 24 are retrieved from a branching unit and a new cable is spliced in. This is then connected to a new hub, and can then be used to connect the hub to new subsea structures such as subsea wells. Further distribution of the DC/FO network to subsea wells or other subsea structures can then be performed by daisy-chaining the DC/FO cable from another subsea well. For example, the distance between the host production platform 15 and hub 16 is greater than 150 km. The DC/FO network therefore uses a high voltage direct current power supply between the host production unit 15 and hub 16. Hub 16 steps down the voltage to a level that is useable by the subsea wells but is limited to a transmission length of a few kilometers. Subsea wells 19 and 20 connect directly to the hub, and subsea well 21 is daisy-chained from subsea well 20.

A subsea end of the DC/FO Riser or landfall cable 23 may include several DC/FO cables which are typically connected to the DC/FO network in one of two ways; subsea retrievable pigtails may be provided on the seabed or as coiled cables in a frame, where each cable pigtail is retrieved for further expansion of the DC/FO network as required. Alternatively (or additionally), the subsea end of the DC/FO Riser or landfall cable 23 is provided with wet-mate high voltage connectors allowing direct connection of a subsea DC/FO cable to the DC/FO Riser or landfall cable 23.

In addition to connection to the DC/FO network, a subsea well must be connected to a subsea fluid conduit in order to receive hydraulic fluids and wellstream service fluids. A separate subsea fluid conduit network is provided. These may follow a pipeline, as shown by subsea wells 25, 26 and 27. These subsea wells obtain electric power and data services from hub 18, and hydraulic and wellstream service fluids via a conduit that could follow the pipeline connecting the subsea wells 25, 26, 27 to the host production platform.

However, the subsea fluid conduits may be provided in a separate network that does not follow the pipelines between the subsea wells and the host production platform. One way to facilitate this is to provide hydraulic riser bases 28, 29. In this case a subsea fluid conduit extends from connected to the host production platform 15 to a hydraulic riser base 28. The hydraulic riser base 28 in this example has three outputs of subsea fluid conduits, allowing it to serve several different subsea wells that are not connected by the same pipeline to the host production facility. Hydraulic riser base 28 receives hydraulic fluids and wellstream service fluids from the host production platform 15 and provides a first subsea fluid conduit that serves subsea wells 30, 31, 32, a second subsea fluid conduit that serves subsea wells 33, 34 and a third subsea fluid conduit that serves subsea wells 19, 20 and 21. If necessary, a subsea fluid conduit could be extended from subsea well 21 to marginal prospect 35, and electric power and data transfer could be provided to marginal prospect 35 from hub 16. It will be appreciated that marginal prospect 35 could be developed using data and electric power transfer from any suitable hub, and obtain a subsea fluid conduit extended from any suitable subsea well or directly from a hydraulic riser base.

A hydraulic riser base need not be fully utilised, but may be available for future expansion. For example, hydraulic riser base 29 is shown having one input subsea fluid conduit and only one output subsea fluid conduit, but a further two subsea fluid conduits could be connected to the hydraulic riser base 29 in the event that future expansion is required. Similarly, branching unit 24 does not split the electric power and data transfer into more than one branch, but could be used to do so in the future.

Note that most of the subsea wells are illustrated as receiving electric power and data transfer services directly from a hub. However, this is not always necessary. Subsea well 21 is illustrated as receiving electric power and data services extended from subsea well 20. Owing to the low voltages, this would limit the allowable distance between subsea wells 20 and 21, unlike a cable between the host production platform and a hub which owing to the high voltage direct current can have a length of greater than 150 kilometers without a significant loss of electric power. However, advantages of connecting electric power and data services to a subsea well 21 from another subsea well include reducing the number of hubs required, which reduces costs. In addition, it is envisaged that whilst DC/FO networks are being implemented, some subsea wells could retain existing umbilicals that provide data, electric power and fluids, whilst others are connected to the new DC/FO network and the new subsea fluid conduit network.

The presence of a network, and possibly also interconnected hubs and branching units, in a developed field allows much easier development of marginal prospects, as separate DC/FO network allows the provision of electric power and data transfer services to subsea wells regardless of where they are located. It is much less expensive to extend existing subsea fluid conduits, as data and electric power need not be provided in a subsea umbilical as with prior art methods, but can be separately provided to each subsea well. This makes the extension of subsea fluid conduits to a potential new subsea well that may be a marginal prospect more attractive. Marginal prospect 35 can easily be provided with electric power and data transfer via hub 16 if required.

A further advantage of using a network of hubs is that electric power and data transfer is be standardized, leading to lower costs and greater reliability. Currently, subsea umbilicals are typically custom made and subsea control systems typically use proprietary protocols for data transfer. The use of a DC/FO network allows marginal prospects to be more easily investigated and exploited, as described above.

The invention can also be used in existing operating fields to replace faulty or damaged umbilicals. This is normally an expensive process, but costs are reduced by replacing existing umbilicals with a DC/FO and subsea fluid conduit networks separately, as and when required (since the lifetime is expected to be longer for a fluid conduit network). As existing umbilicals come to the end of their life, the DC/FO and subsea fluid conduit networks could gradually replace all of the umbilicals.

Furthermore, the provision of a subsea DC/FO network having hubs can reduce the costs of other aspects of subsea hydrocarbon recovery. For example, in addition to providing electric power and data transfer to subsea wells, the hubs can provide electric power and data transfer for condition monitoring of a subsea production system, subsea environmental observatories 36, Autonomous Underwater Vehicles (AUVs), 4D seismic grids on the seafloor and so on. AUVs are typically used for operation of valves, inspection of infrastructure, and in some cases maintenance and repair of infrastructure. Currently the operational time of an AUV is limited by battery life, but the provision of a subsea DC/FO network would allow the AUV batteries to be recharged in the subsea environment Furthermore, the DC/FO network can be used to provide electric power and data transfer services to production pipelines that are used to convey hydrocarbons from a subsea well to the host production facility 15. Electric power and data transfer may be required, for example, for monitoring the wellstream flow in a pipeline branch, condition monitoring of production pipelines, monitoring of valve positions, actuating valves and so on.

The DC/FO network and subsea fluid conduit network can also be used to provide electric power and hydraulic fluids to a subsea processing unit 37. Examples of subsea processing units include units for wellstream boosting or units for wellstream separation (typically oil, gas or water)

As described above, in a preferred embodiment the electric power is provided as direct current. An advantage of using direct current is that electric power can be transmitted over longer distances than using AC. For example, using High Voltage Direct Current (HVDC), losses can be reduced to around 20% per 1,000 km, which makes direct current more attractive for supplying electric power to subsea wells from a remote source. Furthermore, the use of direct current reduces capital costs, as fewer and thinner conductors can be used compared with electric power transmission using AC. This is because the root mean square (RMS) voltage measurement of an AC conductor is only around 71% of the peak voltage, which determines parameters such as the insulation thickness and minimum conductor sizing. Another advantage of using direct current rather than AC is that, in a distributed electric power network, there is no need to synchronise AC sources, further reducing capital costs. The use of direct current allows the transfer of electric power over distances greater than 150 km.

Fibre optic communications are preferred for data transfer as there will be no electromagnetic interference from the DC power part of the cable, and they have a higher bandwidth than electrical transmission and can transmit data over longer distances than electrical transmission owing to very low losses.

Figure 4:
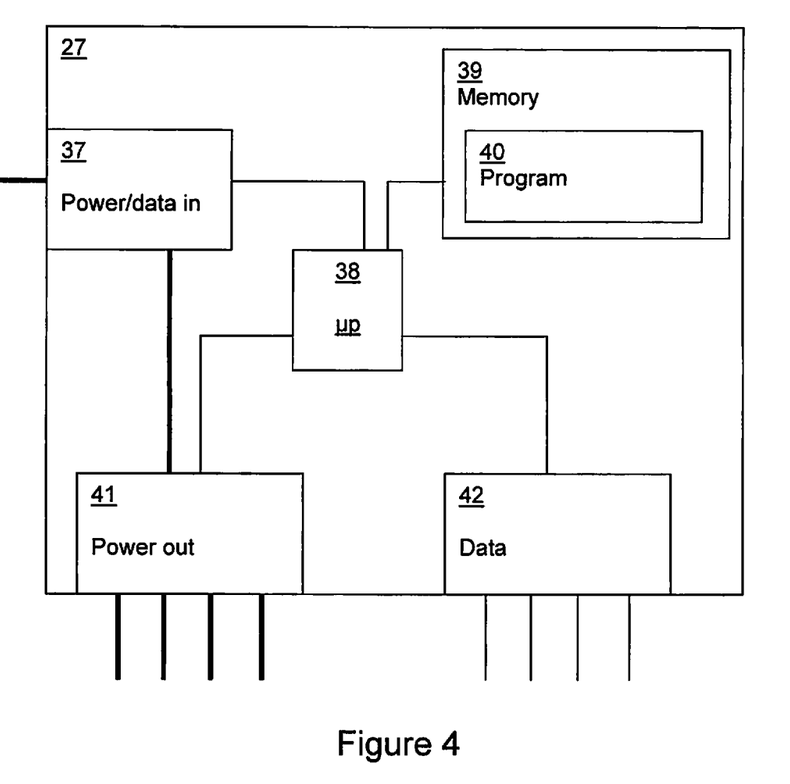
FIG. 4 illustrates schematically in a block diagram a subsea node according to an embodiment of the invention.

Turning now to FIG. 4, there is illustrated schematically in a block diagram an example of a subsea hub node 17. The hub 17 is provided with a unit 37 for receiving electric power and data from an external source. A processor 38 is used to control the operation of the hub 17. A computer readable medium in the form of a memory 37 is provided on which is stored a computer programme 40. When executed by the processor 38, the program 40 controls the operation of the hub 17. The memory 39 may also be used to store data such as a log of the hub's 17 operation. A unit 41 for providing electric power in the network is provided, and a unit 42 for providing data transfer in the network is provided. It will be appreciated that these units operate most efficiently if they are physically combined and comprise a plurality of connectors, each connector having connections capable of providing both data and electric power transfer. There could be separate electric power and data transfer connection points, or a hybrid connector with connection points for electric power and connection points for data.

Figure 5:
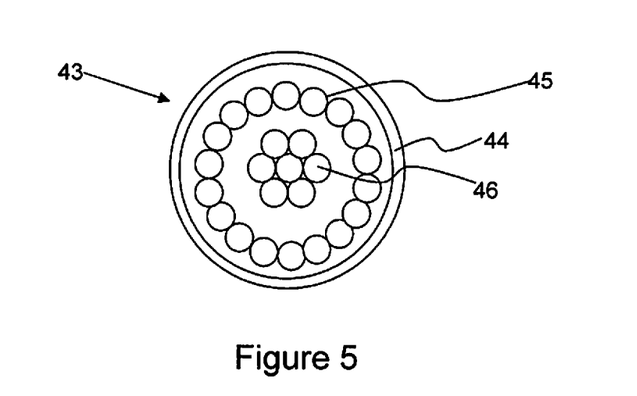
FIG. 5 illustrates schematically a cross-section view of an electric power and data transfer cable.

FIG. 5 illustrates a cross section view of a electric power and data transfer cable 43. The cable comprises a protective sheath 44 in which optical fibres 45 are provided for data transfer, and electric power cables 46 are provided for electric power transfer. Each end of the cable 43 has one or two connectors, one end for connecting to the hub 17 and another end for connecting to a subsea well (typically via a subsea control module) or another subsea asset that requires data and electric power. FIG. 5 is shown schematically by way of example only to illustrate the functional components of an electric power and data transfer cable. A typical cable will have multiple cores for data and one or two electric power cores, and various layers of shielding.

The invention effectively separate the functions of prior art subsea umbilicals into two separate networks; a network for providing electric power and data transfer, and subsea fluid conduits for conveying hydraulic fluids and wellstream service fluids to subsea wells. By providing a separate electric power and data network, costs are reduced and flexibility is greatly increased, allowing easier exploitation of marginal prospects and the provision of electric power and data to other subsea assets such as 4D seismic grids on the seafloor, subsea observatories, AUVs, monitoring systems and production pipelines.

It will be appreciated by the person of skill in the art that various modifications may be made to the above described embodiments without departing from the scope of the present invention. Furthermore, it is possible that hydraulic power for operating valves and so on may be replaced by electrical power, in which case hydraulic fluid will not need to be transported to each subsea well.

The invention claimed is:

1. A subsea oil and/or gas production system comprising:
   a host production facility;
   a plurality of subsea wells connected in series by a plurality of hydrocarbon pipelines to the host production facility;
   a plurality of subsea umbilicals for conveying electric power, data transfer, hydraulic fluid and wellstream service fluids to the plurality of subsea wells;
   a subsea fluid conduit network connected to each of the plurality of subsea wells;
   an electrical power and data network for conveying direct current electrical power and data, operatively connected to at least one of the plurality of subsea wells for providing said at least one of the plurality of subsea wells with data transfer and electrical power services, the direct current electric power and data network being separate from the subsea fluid conduit network, and the direct current electric power and data network conveying no fluid.

2. The subsea oil and/or gas production system according to claim 1 wherein the subsea fluid conduit network is arranged to convey any of hydraulic fluid and wellstream service fluid.

3. The subsea oil and/or gas production system according to claim 1, the system further comprising:
   at least one branching unit between the host production facility and a plurality of hubs, each hub arranged to reduce a voltage in the electrical power received from the branching unit before providing electrical power to at least one of the plurality of subsea wells, the branching unit arranged to receive electrical power and data cables from the host production facility and provide separate electrical power and data cables to said plurality of hubs.

4. A method of replacing/repairing a subsea umbilical in a hydrocarbon production system, the system comprising:
   a host production facility;
   a plurality of subsea wells connected by a plurality of hydrocarbon pipelines to the host production facility;
   a plurality of subsea umbilicals connected to the plurality of subsea wells, the method comprising:

replacing at least one of the plurality of umbilicals with a direct current electrical power and data transfer network, and a subsea fluid conduit network, wherein the subsea fluid conduit network is separate from the direct current electrical power and data transfer network, and the direct current electric power and data transfer network conveying no fluid.

5. A method according to claim 4, wherein the plurality of umbilicals convey electric power, data transfer, hydraulic fluid and wellstream service fluids to the plurality of subsea wells.

6. A method according to claim 4, wherein the subsea fluid conduit network is arranged to convey any of a hydraulic fluid and wellstream service fluid.

* * * * *